INVENTORS.
WILLIAM WALLACE ROWE
AND WARREN A. MORRIS
BY
ATTORNEYS.

Nov. 30, 1943. W. W. ROWE ET AL 2,335,313
METHOD FOR PRODUCING LATERALLY STRETCHABLE WEBS
Filed May 15, 1939   5 Sheets-Sheet 2
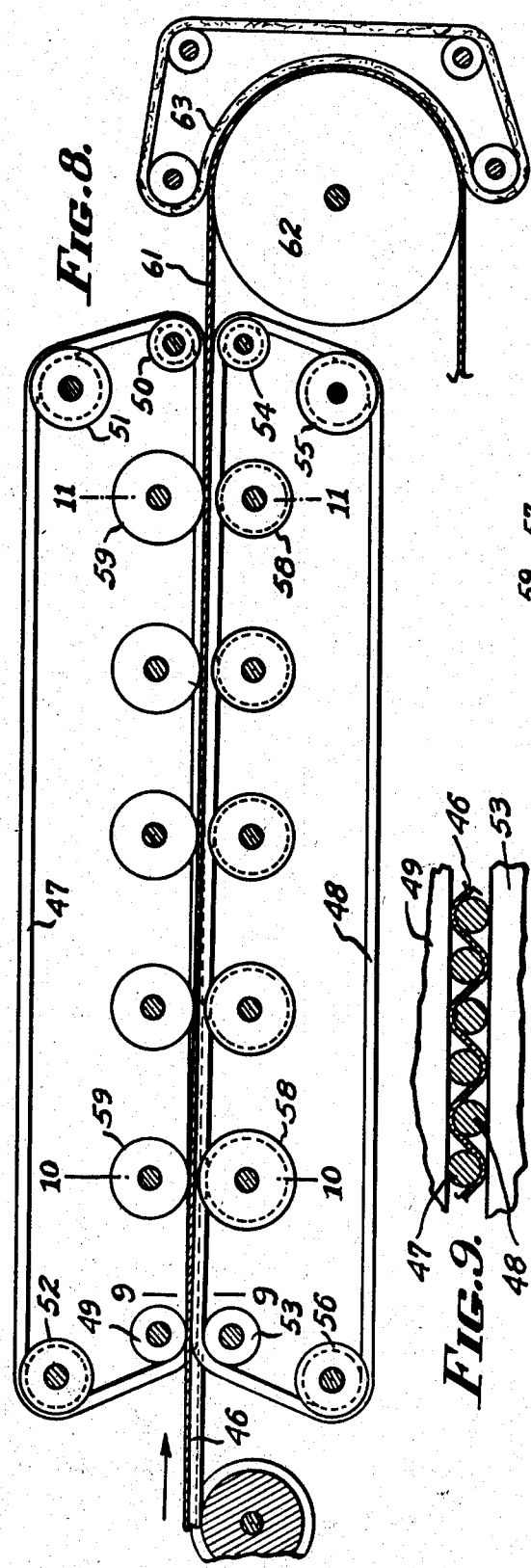
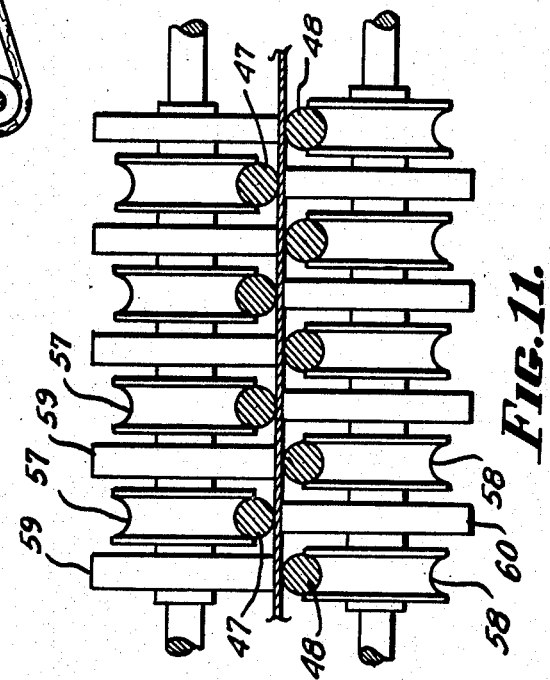
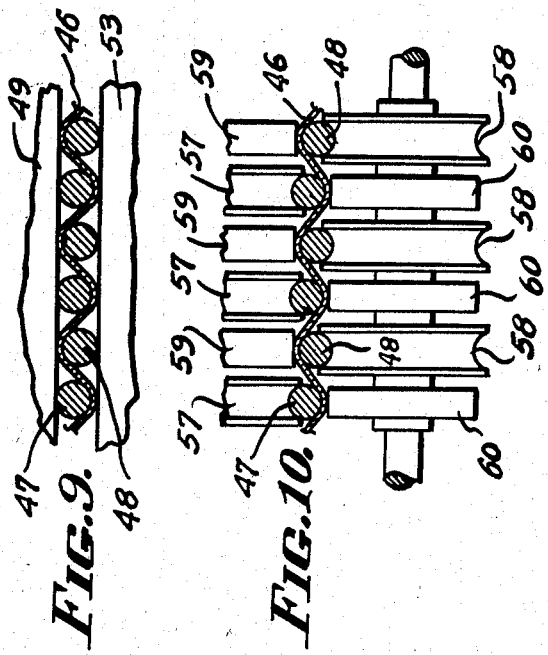
INVENTORS.
WILLIAM WALLACE ROWE
BY AND WARREN A. MORRIS.
ATTORNEYS.

Nov. 30, 1943.  W. W. ROWE ET AL  2,335,313
METHOD FOR PRODUCING LATERALLY STRETCHABLE WEBS
Filed May 15, 1939  5 Sheets-Sheet 3
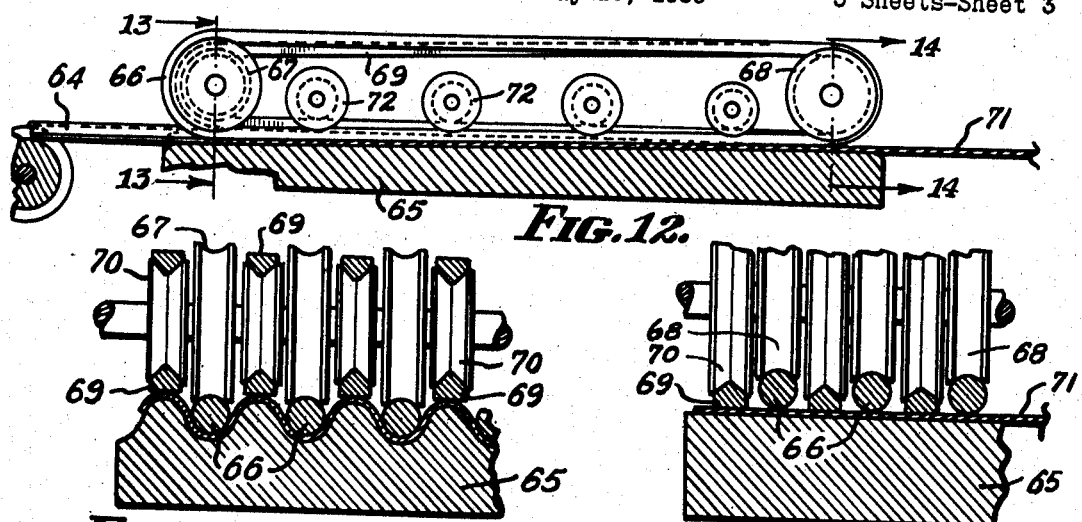
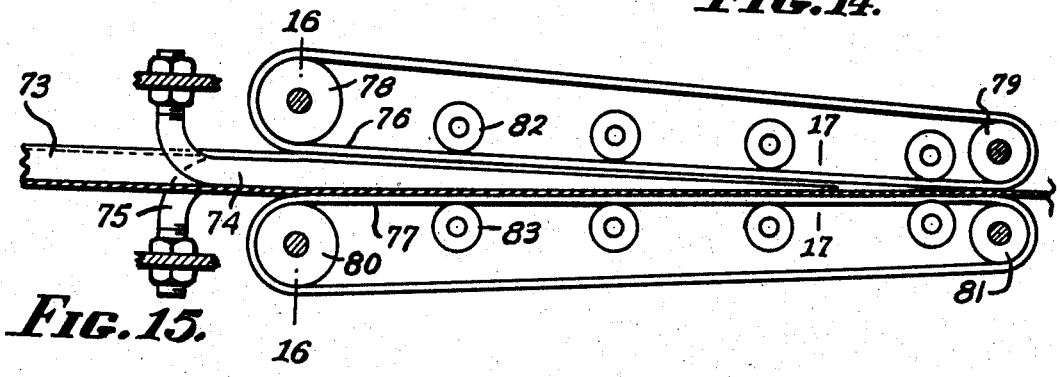
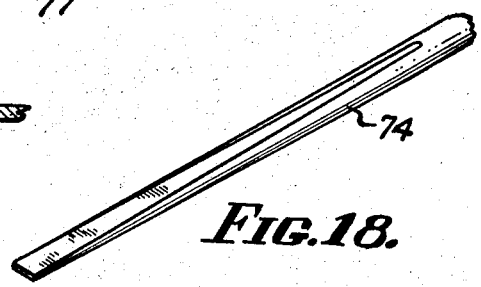
INVENTORS.
WILLIAM WALLACE ROWE
AND WARREN A. MORRIS.
BY
ATTORNEYS.

Nov. 30, 1943. W. W. ROWE ET AL 2,335,313
METHOD FOR PRODUCING LATERALLY STRETCHABLE WEBS
Filed May 15, 1939 5 Sheets-Sheet 4
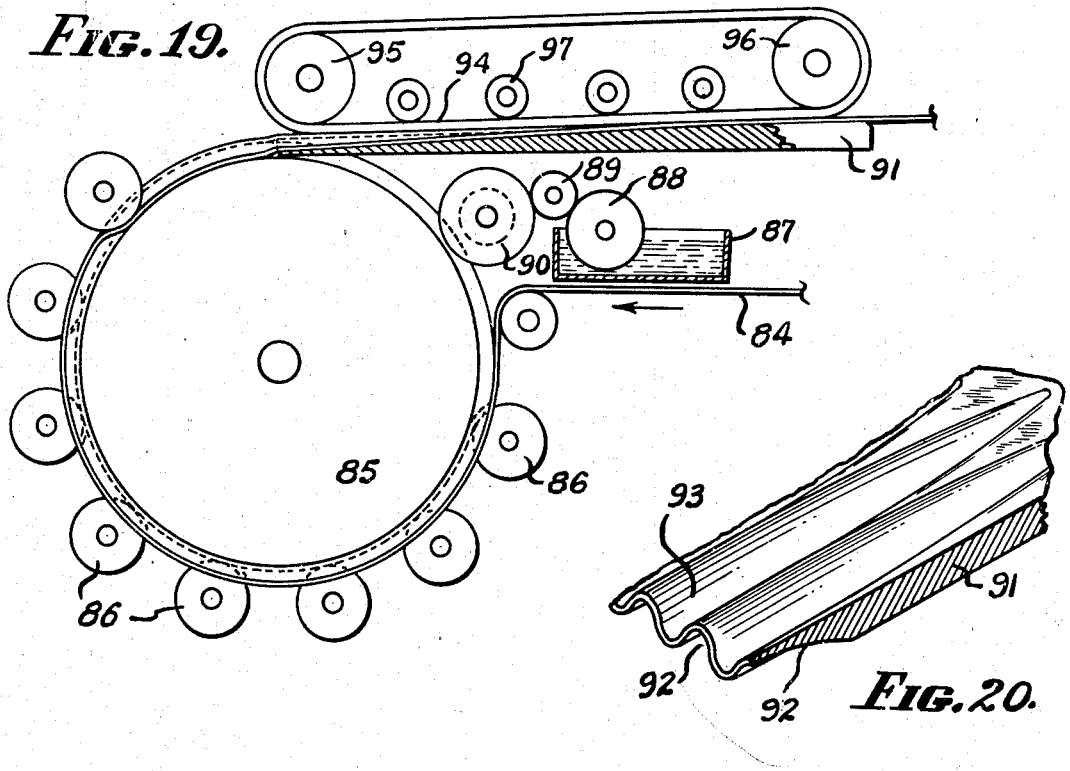
FIG. 19.
FIG. 20.
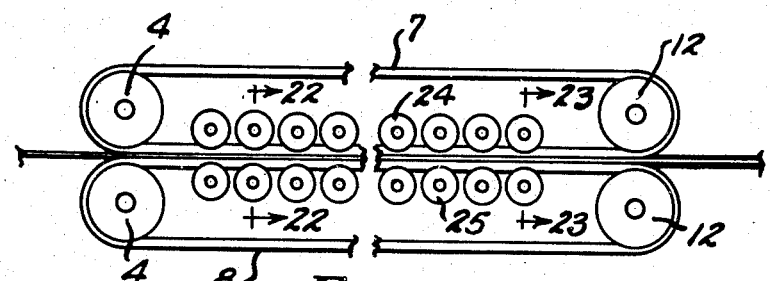
FIG. 21.
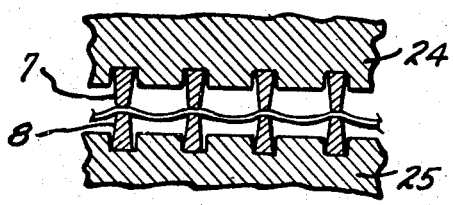
FIG. 22.
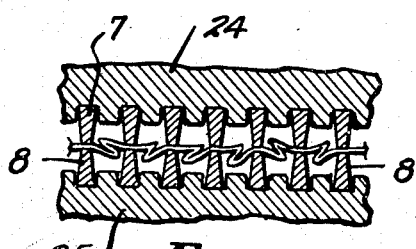
FIG. 23.
INVENTORS.
WILLIAM WALLACE ROWE
AND WARREN A. MORRIS.
BY
ATTORNEYS.

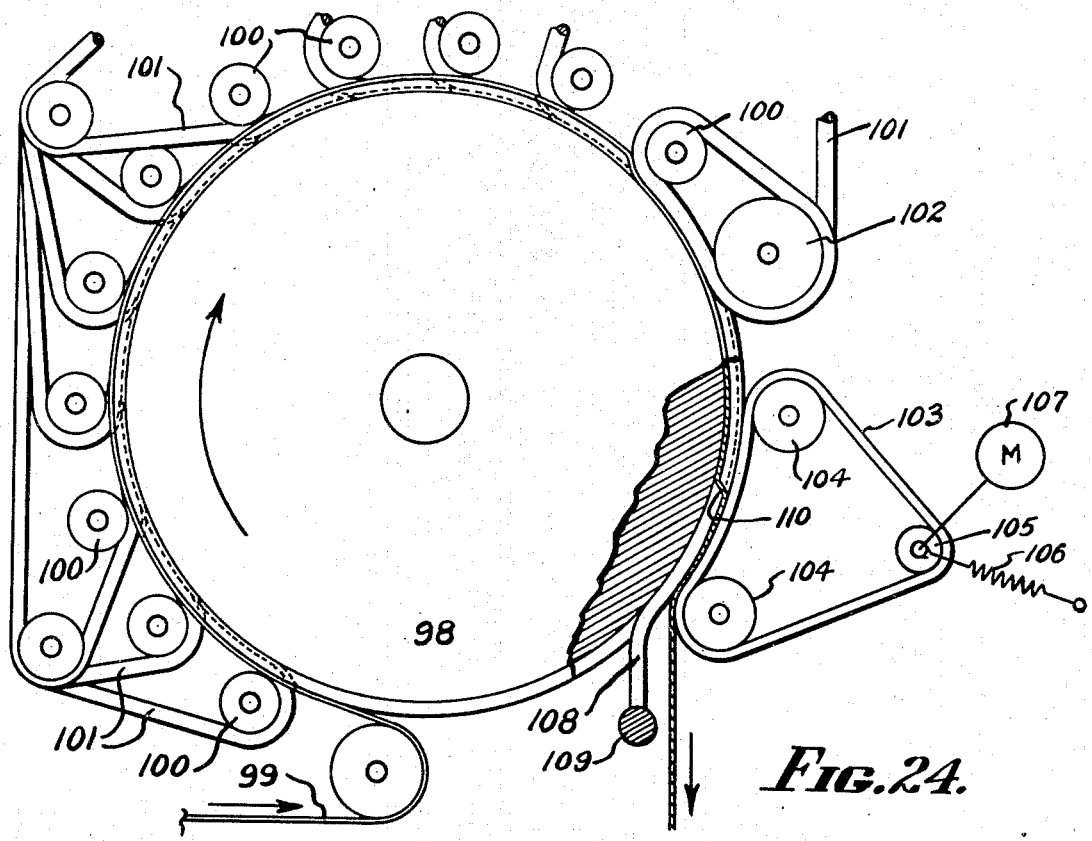
FIG. 24.
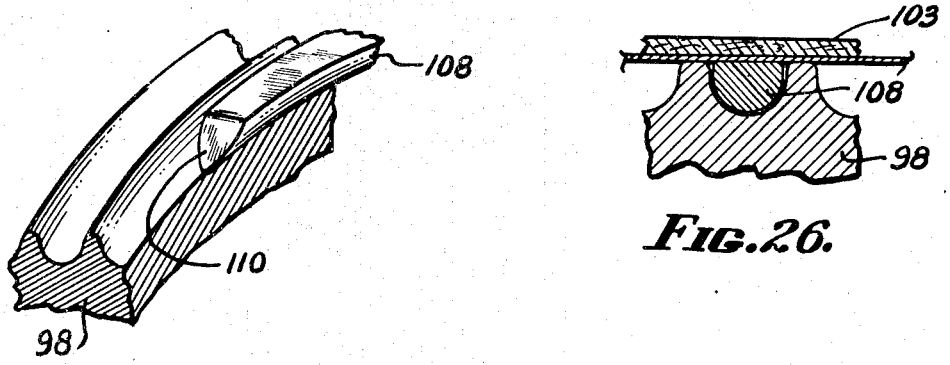
FIG. 25.
FIG. 26.

Patented Nov. 30, 1943

2,335,313

UNITED STATES PATENT OFFICE 2,335,313

METHOD FOR PRODUCING LATERALLY STRETCHABLE WEBS

William Wallace Rowe, Cincinnati, and Warren A. Morris, Wyoming, Ohio, assignors to Cincinnati Industries, Inc., a corporation of Ohio Application May 15, 1939, Serial No. 273,630

11 Claims. (Cl. 154—33.05)

Our invention relates to the formation of webs which are laterally stretchable because the webs by mechanical means have been gathered laterally. Preferably also the webs are stretchable lonigtudinally either because of the formation in them of laterally extending creping crinkles or other types of rugosities, or by reason of the formation in the webs of a type of rugosities effective in imparting to the web multilateral stretchability, all as will be more fully explained hereinafter.

Within the general field of utility of our invention which also is indicative of its fundamental object, an important object is the fomation of a web characterized by a sinuous type of rugosity which will impart multilateral stretchability.

The present application is a continuation in part of our copending case entitled Apparatus for imparting stretchability to webs, Serial No. 69,014, filed March 16, 1936, Patent No. 2,158,087, dated May 16, 1939, and of our copending case entitled, "Creped and corrugated web," Serial No. 159,916, filed August 19, 1937, Patent No. 2,224,713, dated December 10, 1940.

Our invention thus, in one of its aspects, has to do with webs of paper or other materials which have been gathered both laterally and longitudinally so as to be multilaterally or universally stretchable, which webs derive their multilaterally stretchable characteristic in part at least from a sinuous configuration of gatherings therein. Products of this general class we will refer to hereinafter as "herringboned webs" without meaning that a precise herringbone effect is necessary since the lines of rugosity may be staggered instead of forming a wave or a series of V's. An example of a herringboned web is a web of paper having creping crinkles therein which have been distorted out of their original position (in which they extended in more or less straight lines across the web) to a sinuous configuration whereby the web is rendered stretchable laterally as well as longitudinally.

These and other objects of our invention which will be set forth hereinafter or will be apparent to one skilled in the art upon reading these specifications, we accomplish by that certain construction and arrangement of parts and by that certain process of which we shall now set forth several exemplary embodiments. Reference is made to the drawings wherein:

Figure 8 is a longitudinal sectional view of a device of different form for converting a previously corrugated web into a herringbone web.

Figure 9 is a partial sectional view taken along the line 9—9 of Figure 8.

Figure 10 is a partial sectional view taken further along in the machine in the direction of travel of the web, namely along the line 10—10 of Figure 8.

Figure 11 is a partial sectional view taken near the exit point of the machine, namely along the line 11—11 of Figure 8.

Figure 12 is a longitudinal section of still another device for converting a corrugated web into a herringbone web.

Figure 13 is a partial sectional view taken along the line 13—13 of Figure 12.

Figure 14 is a partial sectional view taken along the line 14—14 of Figure 12.

Figure 15 is a longitudinal sectional view of still another apparatus for converting a corrugated web into a herringbone web.

Figure 16 is a partial sectional view taken along the line 16—16 of Figure 15.

Figure 17 is a partial sectional view taken along the line 17—17 of Figure 15.

Figure 18 is a partial perspective view of a finger member employed in the device of Figure 15.

Figure 19 is an elevational view (with parts in section) of an apparatus for both corrugating and herringboning a web.

Figure 20 is a partial perspective view of a doctor member used in connection with the apparatus of Figure 19.

Figure 21 is an elevational view of a modified form of the devices of Figures 1, 2 and 3.

Figure 22 is a section thereof taken along the line 22—22 of Figure 21.

Figure 23 is a section thereof taken along the line 23—23 of Figure 21.

Figure 24 is a vertical sectional view of still another type of apparatus employing a grooved cylinder.

Figure 25 is a partial perspective view showing the cooperation of the fingers and the grooves.

Figure 26 is a sectional view across a finger showing particularly the shape of the outer portion thereof.

In considering this invention, it should be borne in mind that if stretchability is to be imparted to a web, it is essential that the web be gathered in the direction in which the stretchability is to be realized. If a web is to have universal stretchability (e. g., if it is to be stretchable both longitudinally and laterally), it must be gathered both longitudinally and laterally. In the formation of a herringbone web as herein defined, and which has the quality of universal stretchability, several variant procedures may be followed:

A. A web may first be given longitudinal stretchability by creping it in the usual way, and then the desired sinuosity may be imparted to the creping crinkles provided the web is gathered widthwise in proportion to the formation of the sinuosities.

B. Or a web may first be gathered lengthwise by creping, then gathered widthwise as by corrugating, so that the creping crinkles now follow a sinuous path in a plane transverse to the general plane of the web. Then the corrugations may be laid over lengthwise, as it were, thus making them sinuous. This laying over may be accomplished in varying degrees, giving products ranging from the corrugated web first obtained, to a web which is flat, or substantially so, and in which the corrugations have been wholly laid over.

C. Or a web may first be gathered widthwise as by corrugating, and then may be gathered lengthwise as by creping, and finally the corrugations may be laid over lengthwise to the degree desired.

In each of these forms it is incident to the widthwise gathering of the web that portions of the web are displaced lengthwise thereof, with relation to other portions thereof.

Figure 1:
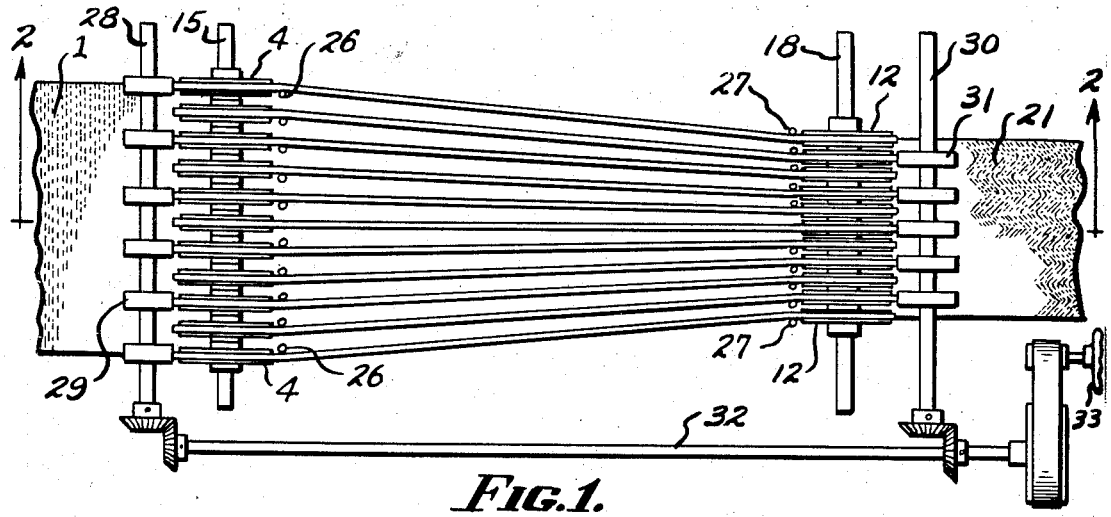
Figure 1 is a plan view of a device for producing a herringbone sheet directly from an initially flat sheet.
Figure 2:
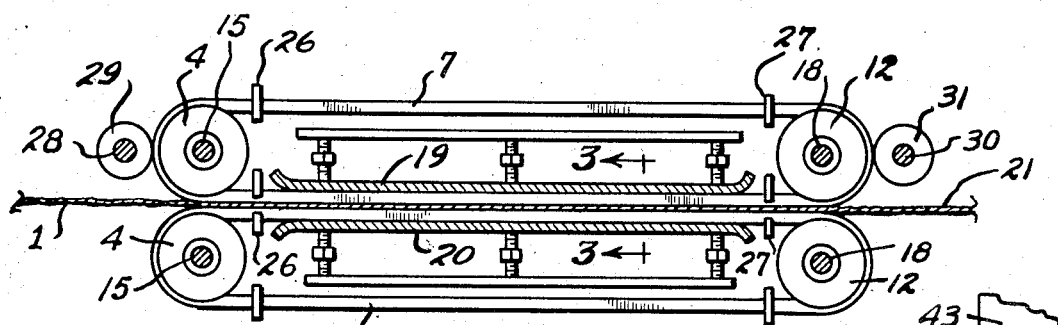
Figure 2 is a vertical sectional view thereof taken along the line 2—2 of Figure 1.
Figures 3, 4:
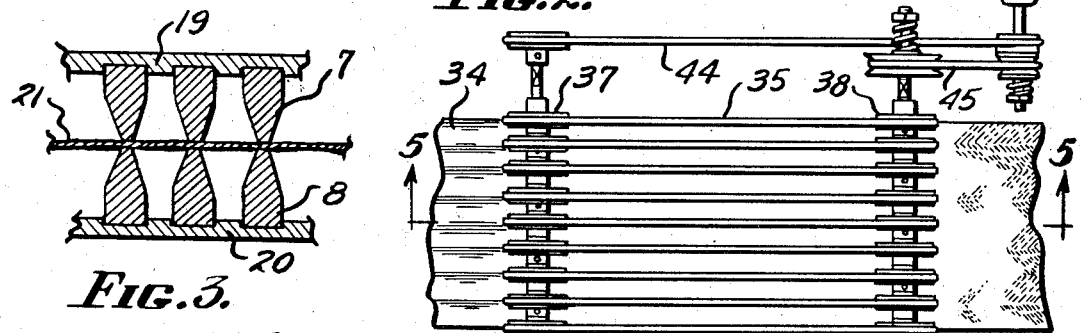
Figure 3 is a partial transverse sectional view taken along the line 3—3 of Figure 2.
Figure 4 is a plan view of a device for producing a certain type of herringbone sheet from a previously corrugated sheet.

In Figures 1 to 3 we have shown an apparatus following the first procedure. A web of paper 1 is shown as having been previously creped, whereby it has longitudinal stretchability. This web is passed between an upper and lower series of belts 7 and 8. These belts travel over respective end sheaves 4 and 12, on shafts 15 and 18. The belts are preferably of substance which can frictionally grip the paper, and are arranged to lie opposite each other in respective pairs, as shown clearly in Figure 3, so as to clamp the paper between them, against motion otherwise than with the belts. The belts may be urged toward each other so as to maintain their clamping engagement by opposed plates 19 and 20 against which the belts move. Other holding means may likewise be employed such as the rolls 24 and 25 of Figures 21 to 23, which may be grooved to accept the belts. Also it will be noticed that in their travel with the web from sheaves 4 to sheaves 12 the belts converge.

The result of this convergence, if nothing else be done, will be to gather the web widthwise as clearly shown in Figures 22 and 23, the web buckling or corrugating between respective pairs of the clamping belts. Such a product could be passed out of the device and into a crushing apparatus, and is similar to the creped and corrugated and crushed webs which have now become commercially well known. In order to assist in maintaining the belts in their converging paths, we may use small guide rolls 26 and 27.

It is, however, the purpose of the apparatus of Figures 1, 2 and 3 to produce, not a corrugated web, but a flat, or substantially flat herringboned web, as defined. In accomplishing this, we drive alternate pairs of the clamping belts at a faster speed than the rest. When this speed is carefully correlated to the amount of widthwise gathering as it is formed, the result is to move portions of the web ahead of other portions so as to take up the widthwise gathering in sinuosities in the crinkles, which sinuosities lie essentially within the general plane of the web. If the speed correlation is less perfect, and the faster traveling clamping pairs do not maintain a speed difference over the others equal to the widthwise gathering as it is formed, the web will be more or less buckled or corrugated, while still being herringboned.

A mode of effecting differential motion has been shown, wherein the respective sheaves 4 and 12 are rotatably mounted upon the shafts 15 and 18. A shaft 28 parallels the shaft 15 and bears friction driving discs 29. These discs contact alternate ones of the belts on the sheaves 4 and drive them. A shaft 30 parallels the shaft 18 and bears friction driving discs 31 which contact and drive the other belts as they pass over alternate ones of the sleeves 12. The shafts 28 and 30, through gearing of appropriate ratio for the speed differential, may be driven from a single shaft 32 by motive means 33. While we have shown only the belts 7 so driven, a similar mechanism may be provided for the belts 8. With differential motion of the webs the holding sheaves 24, 25 of Figure 21 where used, will take a form like that shown in Figure 6.

Figures 5, 6:
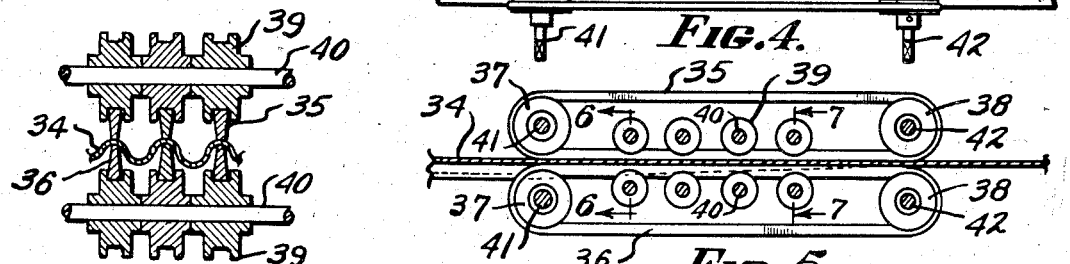
Figure 5 is a longitudinal sectional view thereof taken along the line 5—5 of Figure 4.
Figure 6 is a partial sectional view taken along the line 6—6 of Figure 5.
Figure 7:
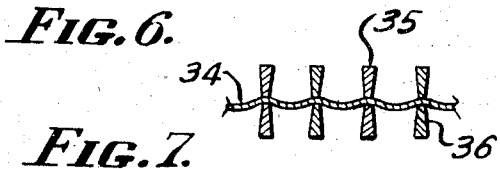
Figure 7 is a partial sectional view taken along the line 7—7 of Figure 5.

The use of opposite pairs of belts having a clamping action on the paper is also appropriate for converting a previously creped and corrugated web into a herringboned web. We have shown an apparatus for this in Figures 4 to 7 inclusive. Here a creped and corrugated web 34 is led between an upper set of belts 35 and a lower set of belts 36 on end sheaves 37 and 38. Intermediate holding sheaves 39 may be provided; and because of the differential motion of the belts, each set of such sheaves will comprise individual sheave elements loosely mounted on shafts 40 so as to be capable of rotation of different speeds. A variant type of drive is illustrated in Figures 4 and 6. Here alternate ones of the sheaves 37 are fast to the shaft 41, the others being free to rotate thereon. In Figure 6 the fast sheaves are indicated at 39. Alternate ones of the sheaves 38 are fast to the shaft 42 the fast sheaves being opposite the free sheaves on shaft 41. The sheaves on shaft 42 opposite fixed sheaves on shaft 41 are free on the shaft. Thus shaft 41 drives alternate belts and shaft 42 the remainder. The shafts may be driven from a single motive means 43 by drives 44 and 45 of any suitable form, and at appropriately different speeds.

Since the web 34 is creped and corrugated, it has already received its widthwise and lengthwise gathering or contraction. Hence it may be herringboned within the limits of its widthwise stretchability without the use of converging belts. We have therefore shown the belts traveling in straight lines; but they could be converging if still more stretchability is desired. The manner of engagement of the belts with the corrugated web is shown in Figure 6, and it will be noted that the belts clamp only the crests of the corrugations as viewed from one side of the web. This simplifies the threading of the machine. Also it results in each herringbone cycle comprising two corrugation cycles, as will be clear; but the stretchability is the same.

In Figures 8 to 11 inclusive we have illustrated a type of machine in which we convert a creped and corrugated web into a herringboned web by members which not only have a speed differential as outlined above, but lie within the crests and valleys of the corrugations and come progressively out of interdigitation as the web is flattened by being herringboned. We have shown a creped and corrugated web 46 entering between series of belts 47 and 48. The belts at the start of their travel, as shown in Figure 9, are arranged in substantial interdigitation so that they engage the corrugated web, one set having engagement with the crests of the corrugations, and the other set having engagement with the valleys thereof. The belts pass respectively over sheaves or rollers 49 to 52 and 53 to 56. By means of certain or all of these sheaves, the belts are driven with a speed differential calculated during the course of travel of the web in the machine to lay over the corrugations so as to form a herringbone sheet. As the belts travel together in the direction of the arrow in Figure 8, the belts come gradually out of interdigitation by the amount the sheet is flattened in forming the herringbone. In order to keep the sheet or webs in contact with the belts so that the various parts of the sheet or web are differentially moved throughout the travel of the belts, we provide both supporting means for the belts and means opposite these supporting means for holding the web against the belts. Figure 10 is a section taken through the machine at a point of travel of the belts where they are still in substantial interdigitation. The upper set of belts is shown supported by sheaves 57, and the lower set of belts is shown supported by sheaves 58. Intermediate these sheaves respectively are an upper set of rollers 59 which act to press the web 46 against the belts 48; and intermediate the lower sheaves there are rollers 60 which act to press the web against the belts 47, as will be clear. The rollers 59 and 60 may if desired be metal rollers faced with rubber or some other frictional or resilient substance. Since the sheaves and rollers on any shaft must turn at different speeds, one or both sets may be left free on the shafts. Figure 11 is a sectional view taken further along in the machine when the belts have come out of interdigitation and when the sheet has become substantially flattened by being herringboned. The number of holding means along the length of the belts may be varied in accordance with convenience; but by reason of the fact that the belts come out of interdigitation, it will be noted by comparing Figures 10 and 11 that in the direction of travel of the machine the sheaves 57 and 58 become progressively smaller while the back up rollers 59 and 60 become progressively larger. By reason of the fact that the web 46 is corrugated and creped before it enters the machine, the belts 47 and 48 do not have to converge as they travel but may and preferably do travel in straight lines.

The exact timing of the differentially moving members which must be had when the web being treated cannot slip with reference to them becomes less necessary to the extent that slippage may occur. Thus, in our various mechanisms, we have situations on the one hand where the web is definitely clamped without the substantial slippage between moving members different pairs of which move at different speeds and on the other hand we have situations in which the web moving with one member or several members is caused to slip with respect to stationary members contacting the web in other portions. Between these two extremes, slippage may occur and may be relied upon to compensate for lack of exact timing.

Also, while we have herein described belts, grooved cylinders and the like, it will be understood that we may employ grooved moving surfaces other than cylinders, such as grooved belts, and also that instead of cylinders we may employ cylindrical members made up of different disc like parts which may or may not have relative movement.

In all operations of imparting stretchability to webs, for example webs of paper, provision must be made to retain the stretchability after it has been imparted to the web. With some weblike materials such as metallic strips (e. g., foil or heavier materials, or foil in combination with backing materials) there may be little natural resilience in the web tending toward loss of stretchability. With paper it is advisable to employ some definite means for preventing loss of stretchability through the natural resilience of the web. We prefer to do the forming operations on our paper while the paper is wet, and then dry the paper after it has been herringboned, which has the effect of setting the rugosities in the form imparted by the action of the machine. By way of example in Figure 8 we have shown the herringboned sheet 61 passing immediately to a drying cylinder 62 against which the web is held by a traveling felt or other suitable substance 63 as will be readily understood by the skilled worker in the art. The number of drying means employed does not form a limitation upon our invention.

In Figures 12 to 14 we have shown still another type of apparatus for converting a corrugated web into a herringboned one. Here the corrugated web 64 is led onto a grooved plate 65 which at the entrance end is grooved to conform to the corrugations in the paper, but in which plate the grooves gradually taper off to nothing so that the plate has a smooth upper surface at the exit end of the machine. In order to maintain the paper or other web in the grooves, we pass belts 66, running over sheaves 67 and 68, into the grooves with the paper. These belts press the paper into the grooves and cause it to travel along the plate. Next we contact the web on the ridges or lands of the grooved plate 65 by means of belts 69 passing over sheaves 70. These belts hold the web against the ridges of the plate and cause it to move; but by means which will be understandable upon consideration of such figures as 1, 4, 10 and 11 hereof, we drive the belts 69 at a different speed from the belts 66, so that the crests of the corrugations during the travel of the web are either urged forwardly or held back so as to be progressively laid over, by an action which will now be understandable, with the ultimate result of producing at the exit end of the machine the substantially flat herringboned sheet 71. Holding means 72 will be employed at suitable intervals within the length of travel of the belts.

In Figures 15 to 18 we have shown a type of apparatus for handling a corrugated and creped web 73. This web is threaded between upper and lower series of fingers 74, 75 which lie within the crests and valleys of the web as clearly shown in Figure 16. The fingers 74, 75 however taper off in the plane of the web. So as to move the web, we bring against it from either side flat belts or felts 76, 77 passing over sheaves 78 to 79 and 80 to 81. Holding means 82, 83 are employed throughout the length of the belts as required. The belts are driven at differential speeds as hereinabove explained, so that as the fingers 74, 75 taper off, they flatten the sheet by moving parts of it relative to other part so as in effect to lay over the corrugations and form a herringboned product. The progressive occurrence of this action will be understandable from a comparison of Figures 16 and 17 which are respective sectional views taken along the machine.

In Figures 19 and 20 we have illustrated still another type of apparatus wherein a web 84 is led against the surface of a grooved cylinder 85 and is caused successively to conform to the surface of the cylinder (whereby it is corrugated longitudinally and contracted widthwise), by means of appropriate rolls or the like 86 preferably following the principle of successive interdigitation. A corrugating apparatus of this type is explained more in detail in the copending application of W. W. Rowe entitled Process of producing corrugated papers, Serial No. 34,687, filed August 5, 1935, Patent No. 2,190,680 dated February 20, 1940. For the maintenance of corrugations at least during the formation of adjacent ones, we prefer to employ adhesive means which may be applied if desired from a pan 87 to the cylinder 85 by means of rolls 88, 89 and 90. The adhesive can however be applied to the web 84 if desired. Also it may be applied all over the web or cylinder or in selected areas only such as the bases of the grooves or the lands of the grooves in the cylinder 85. The web having thus been corrugated is removed from the cylinder by means of a knife 91. A portion of this knife is shown in detail in Figure 20 and it will be noted that it is grooved below as at 92 to cause it to conform to the grooved surface of the cylinder and is grooved above as at 93 for a purpose hereinafter to be explained. The grooves 93 as will also be noted taper off to nothing so that at its right hand end the upper surface of the knife becomes smooth.

The web 84 as it is led onto the cylinder 85 may be in creped condition, in which event the doctor 91 may be a mere scraper for removing the web. If however the web 84 is plain as it is led onto the surface of the cylinder 85, the doctor or knife 91 may be caused to crepe it whereby to give it longitudinal stretchability as it removes it from the cylinder. If the web has been cemented to the cylinder 85 all over, it will be necessary to employ a knife the leading end or creping V of which lies wholly in a plane radial to the cylinder 85; and we have illustrated such a knife.

As the web comes off over the knife, we press it against the surface of the knife by means of a belt 94 passing over sheaves 95 and 96 and appropriately driven at a speed proper for the removal of the web without undesirably removing stretchability from it. Back up or holding means 97 will likewise be employed. Because the grooves 92 in the knife taper off as shown in Figure 20 this factor in and of itself has an obvious tendency to lay the corrugations down, i. e., to hold them back, so that the herringboned effect is produced. It will be recalled that the paper is being driven along the lands of the grooves 93 by the belt 94 but is undriven in the grooves 93. Thus there is a drag on the paper sufficient to lay over the corrugations. This action is enhanced, where adhesive is employed, by the resistance of the adhesive to slippage in the grooves 93. Also if desired fingers (not shown) may be caused to enter these grooves above the web and impose still more resistance to the movement of the web.

In Figure 24, we have shown still another type of apparatus employing a grooved cylinder 98. It will be understood that in lieu of a grooved cylinder we may employ in this instance also a series of interspaced belts moving in any desired path. The web 99 is led against the cylinder or other corrugating member and caused to conform thereto so as to become corrugated, by a series of forming elements 100 in known manner. We have indicated belts 101 passing over these forming members and returning over a common sheave 102 at which point on the cylinder surface the web has become corrugated. It will be understood from explanations given hereinabove that if the crests of the corrugations of the web can be caused to continue to travel with the lands or ridges on the cylinder 98, or its equivalent, whereas the web in the grooved portions thereof is held back, the desired effect will be obtained as a consequence. In this instance we provide both means for causing the crests of the corrugated web to continue to travel with the corrugating means and means for holding back the depressions of valleys in the corrugated web. For the first means we have shown a belt 103 passing over sheaves or rolls 104 by which a portion of the web is caused to travel with and follow the lands on the cylinder 98. In order to hold the paper against these lands the belt may be tensioned by means of a roll 105 having a resilient mounting as at 106. It may be advantageous to drive the belt at or even faster than the peripheral speed of the lands and to this end we have indicated a motor 107 coupled to it. The power for this purpose, of course, may be derived from the main drive.

As means for retarding the grooved portion of the web, we have shown a series of fingers entering the grooves of the cylinder 98 beneath the web. These fingers are indicated at 108 and they are suitably supported as at 109. They do not have a creping function but act merely to scrape or lift the web from the surface of the cylinder. The fingers have noses 110 which are designed to provide a retarding and lifting action. This action may be controlled by control of the configuration of the noses of the fingers. The situation where the fingers rise almost to the belt is shown in Figure 26, where we have indicated that the fingers have flat upper portions.

One advantage of this construction and procedure over that shown in Figures 19 and 20 is that there is little frictional retarding action on the web excepting at the points where the grooves of the web are to be laid over, since the crests of the corrugations in the web are carried forward with the moving lands of the corrugating apparatus 98.

Modifications may be made in our invention without departing from the spirit of it.

Having thus described our invention what we claim as new and desire to secure by Letters Patent, is:

1. A process of corrugating a creped web which comprises contacting said web upon one side with a series of corrugating elements, and from the other side displacing said web between said first mentioned elements by means of a series of other elements, whereby the elements of the several series are brought into interdigitation, said elements being disposed in a direction transverse to the creping crinkles in said web, and producing in the corrugated pattern sinuosities substantially coincident with the corrugations therein, whereby to translate a substantial portion of the widthwise stretchability resident in corrugations in said web to stretchability resident in said sinuosities, by moving one series of said elements relative to the other series of said elements during travel of said web, and by diminishing the interdigitation of said elements by amounts proportionate to the differences in speed thereof.

2. A process of imparting multilateral stretchability to webs which comprises contracting the webs lengthwise and thereafter contracting the webs widthwise, and moving portions of said webs as so contracted relative to other portions thereof so as to impart to rugosities formed in the first contracting operation a sinuous character as observed transversely to the general plane of said webs, and concurrently diminishing the depth of said rugosities whereby to translate a substantial part of the stretchability originally resident in said rugosities to stretchability inherent in the sinuosities so formed.

3. A process of imparting multilateral stretchability to webs which comprises gathering said webs by contracting them lengthwise so as to form rugosities therein extending generally transversely to said webs, thereafter gathering said webs widthwise so as to form therein rugosities extending generally longitudinally of said webs so that said first mentioned rugosities are caused to have a sinuous disposition in planes transverse to the general plane of said webs, and thereafter altering the said sinuosity of said first mentioned rugosities to a sinuosity apparent when said webs are viewed transversely to their general plane, whereby to diminish the depth of said rugosities without diminishing the widthwise stretchability of said webs.

4. A process of producing multilaterally stretchable webs which comprises contracting webs longitudinally so as to form generally transversely extending rugosities therein, contracting said webs widthwise so as to form generally longitudinally extending corrugations therein, and thereafter, without substantially decreasing the widthwise contraction of said webs, laying over said corrugations so that the first mentioned rugosities follow a sinuous path substantially in the plane of said webs.

5. A process of imparting widthwise stretchability to webs, which comprises leading a web between longitudinally disposed elements on either side thereof, bringing said elements into clamping engagement with said web, and while moving said elements with said web, converging said elements so as to distort said web out of its plane between said elements.

6. A process of imparting widthwise stretchability to webs, which comprises leading a web between longitudinally disposed elements on either side thereof, bringing said elements into clamping engagement with said web, and while moving said elements with said web, converging said elements so as to distort said web out of its plane between said elements, and moving alternate clamping pairs of said elements at speeds faster than the speeds of the remaining pairs of said elements by a sufficient amount in part at least to take up the distortion of said web out of its plane between said elements.

7. A process of producing a herringboned web which comprises corrugating a web so as to contract it widthwise, clamping crests of corrugations in said web between clamping elements traveling therewith, and moving different pairs of said clamping elements at different speeds whereby said corrugations are caused to be converted into herringboned rugosities lying more nearly in the general plane of the web.

8. The process as claimed in claim 7 wherein the web is first given longitudinal stretchability by the gathering thereof to form substantially laterally extending rugosities.

9. A process of producing a herringboned web which comprises gathering a web longitudinally, thereafter gathering said web widthwise so as to form generally longitudinally extending corrugations therein, engaging crests and valleys of said corrugations and during the travel of said web differentially moving said crests and valleys so as to tend to flatten said web without substantially diminishing the widthwise stretchability thereof.

10. A process of producing a herringboned web which comprises gathering a web longitudinally so as to produce transversely extending rugosities therein, then gathering said web widthwise so as to produce longitudinally extending corrugations therein, engaging crests and valleys of said corrugations by means comprising interdigitating members, and moving said crests and valleys at differential speeds while bringing said members out of interdigitation in a correlated manner.

11. A process of making a herringboned web which comprises providing a corrugated surface, causing said web to conform to said surface whereby to contract it laterally and form in it longitudinally extending corrugations, removing said web from said surface with a doctor whereby to contract it longitudinally and crepe it transversely in corrugated condition, and thereafter displacing parts of said corrugated and creped web with respect to other parts so as in part at least to convert the corrugations therein into sinuosities lying in the general plane of said web.

WILLIAM WALLACE ROWE.
WARREN A. MORRIS.